(12) United States Patent
Dietlein et al.

(10) Patent No.: US 11,550,304 B2
(45) Date of Patent: Jan. 10, 2023

(54) SYSTEM AND METHOD FOR THE AUTOMATED PRODUCTION OF A WIRING HARNESS

(71) Applicant: LEONI Bordnetz-Systeme GmbH, Kitzingen (DE)

(72) Inventors: Fabian Dietlein, Neustadt/Aisch (DE); Christian Guni, Kitzingen (DE); Paul Heisler, Amberg (DE); Roland Jaecklein, Volkach (DE); Paulo Martins, Kitzingen (DE); Onur Tavsel, Wuerzburg (DE)

(73) Assignee: LEONI Bordnetz-Systeme GmbH, Kitzingen (DE)

( * ) Notice: Subject to any disclaimer, the term of this patent is extended or adjusted under 35 U.S.C. 154(b) by 608 days.

(21) Appl. No.: 16/604,346

(22) PCT Filed: Apr. 9, 2018

(86) PCT No.: PCT/EP2018/059018
§ 371 (c)(1),
(2) Date: Oct. 10, 2019

(87) PCT Pub. No.: WO2018/189104
PCT Pub. Date: Oct. 18, 2018

(65) Prior Publication Data
US 2020/0159193 A1 May 21, 2020

(30) Foreign Application Priority Data

Apr. 10, 2017 (DE) .................... 10 2017 206 140.5

(51) Int. Cl.
*H01B 13/012* (2006.01)
*G05B 19/418* (2006.01)
*B25J 5/02* (2006.01)

(52) U.S. Cl.
CPC ............ *G05B 19/4182* (2013.01); *B25J 5/02* (2013.01); *H01B 13/01209* (2013.01);
(Continued)

(58) Field of Classification Search
CPC .................... H01B 13/01209; H01B 13/01236
See application file for complete search history.

(56) References Cited

U.S. PATENT DOCUMENTS

| | | |
|---|---|---|
| 4,593,452 A | 6/1986 | Keahey et al. |
| 5,606,909 A | 3/1997 | Ohta et al. |

(Continued)

FOREIGN PATENT DOCUMENTS

| | | |
|---|---|---|
| CN | 101688959 A | 3/2010 |
| CN | 103943284 A | 7/2014 |

(Continued)

OTHER PUBLICATIONS

Japanese Decision to Grant a Patent dated Jan. 6, 2021 in corresponding application 2019-555185.

(Continued)

*Primary Examiner* — Peter Dungba Vo
*Assistant Examiner* — Jose K Abraham
(74) *Attorney, Agent, or Firm* — Muncy, Geissler, Olds & Lowe, P.C.

(57) ABSTRACT

A system for the automated manufacture of a wiring harness, which demonstrates a branched structure made up of multiple individual conductor elements. To form wiring harnesses having an individually branched structure, the conductor elements are automatically brought into a predefined distribution structure, multiple second rails oriented in parallel to each other and multiple second transporters, distributed on the second rails, being used for this purpose. The second transporters are each fitted with one wire end of the conductor elements. To form the distribution structure, the (Continued)

second rails are subsequently moved in a vertical direction, and the second transporters are moved along the second rail. In this spread-apart structure, additional processing steps are carried out, for example a fixing of the conductor elements to each other.

14 Claims, 5 Drawing Sheets

(52) U.S. Cl.
CPC ............... *H01B 13/01236* (2013.01); *G05B 2219/39001* (2013.01); *G05B 2219/39102* (2013.01); *G05B 2219/45097* (2013.01)

(56) References Cited

U.S. PATENT DOCUMENTS

| | | | |
|---|---|---|---|
| 6,490,785 | B1 | 12/2002 | Kometani |
| 8,218,926 | B2 | 7/2012 | Griffioen |
| 11,195,642 | B2 * | 12/2021 | Dietlein ........... H01B 13/01209 |
| 2002/0004983 | A1 * | 1/2002 | Takada ................ H01R 43/20 29/748 |
| 2002/0029470 | A1 * | 3/2002 | Takada ................ H01R 43/048 29/748 |
| 2002/0144395 | A1 * | 10/2002 | Soriano ................ H01R 43/20 29/748 |
| 2018/0075951 | A1 * | 3/2018 | Maki ..................... B23P 21/00 |
| 2018/0108458 | A1 * | 4/2018 | Maki ..................... H01R 43/20 |
| 2018/0134514 | A1 * | 5/2018 | Porter ................... B65H 65/00 |

FOREIGN PATENT DOCUMENTS

| | | |
|---|---|---|
| CN | 104952548 A | 9/2015 |
| DE | 3327583 A1 | 2/1985 |
| DE | 3820638 A1 | 12/1989 |
| EP | 0661721 A1 | 7/1995 |
| JP | S6319781 A | 1/1988 |
| JP | H01130422 A | 5/1989 |
| JP | H07176225 A | 7/1995 |
| JP | H07201236 A | 8/1995 |
| JP | 2000173368 A | 6/2000 |
| JP | 2001001221 A | 1/2001 |
| JP | 2016192354 A | 11/2016 |
| TW | 199937 B | 2/1993 |
| WO | WO2016158339 A1 | 10/2016 |

OTHER PUBLICATIONS

Korean Office Action dated Apr. 28, 2021 in corresponding application 10-2019-7033068.
International Search Report dated Jul. 5, 2018 in corresponding application PCT/EP2018/059018.
Chinese Office Action dated Apr. 29, 2022 in corresponding application 201880023624.1.

* cited by examiner

SYSTEM AND METHOD FOR THE AUTOMATED PRODUCTION OF A WIRING HARNESS

This nonprovisional application is a National Stage of International Application No. PCT/EP2018/059018, which was filed on Apr. 9, 2018, and which claims priority to German Patent Application No. 10 2017 206 140.5, which was filed in Germany on Apr. 10, 2017, and which are both herein incorporated by reference.

BACKGROUND OF THE INVENTION

Field of the Invention

The invention relates to a system and a method for the automated manufacture of a wiring harness, in particular for a motor vehicle.

A wiring harness generally comprises a large number of individual conductor elements, which are connected to each other. The conductor elements are, in particular, wires, twisted wire (pairs), optical waveguides or even prefabricated partial cables, for example non-metallic sheathed cables. A wire is generally understood to be a conductor surrounded by an insulation, either a conductive wire or a stranded wire. A particular wiring harness has a branched structure, which corresponds to a later wire-laying structure, for example within a motor vehicle or in another installation. A branched structure is understood to mean that individual conductor elements branch off of a main strand in different positions of the wiring harness. In a finished wiring harness, plugs or other contact elements are usually attached to the ends of some of the conductor elements.

Description of the Background Art

The manufacture and handling of wiring harnesses of this type is complex. In the automotive industry, in particular, a variety of different wiring harness types exist—even in an identical motor vehicle model—due to the different equipment variants predefined individually by the customer. A wiring harness for a motor vehicle individually configured by the customer is usually not manufactured until after the customer order is received. Due to the desirable short delivery times, a preferably fast manufacture of an individual wiring harness is aimed for.

Due to the great type and variant diversity of these individual wiring harnesses, it is difficult to automate the manufacture of wiring harnesses of this type, which is why a great proportion of manual work is still necessary for manufacturing wiring harnesses specifically for the automotive industry. The individual conductor elements are typically manually laid along so-called cable boards according to a predefined individual branched structure, and the individual conductor elements are subsequently fixed to each other manually, for example by means of taping.

A partially automated method for manufacturing wiring harnesses from conductor strands is apparent from DE 33 27 583 A1. In this method, the prefabricated conductor strands are first detachably connected to each other with the aid of coupling pieces and combined into an endless conductor, which is wound, for example onto a winding device. The coupling pieces are then detached from the conductor strands, and plug housings are fastened to the ends in another apparatus, and the wiring harness is subsequently formed.

Another automated method for manufacturing a wiring harness is apparent from DE 38 20 638 C2. Prefabricated conductor elements are inserted into plug housings with the aid of an industrial robot. The plug housings are arranged along a line on a vertically oriented wire-laying board. The conductor strands between two adjacent plug housings hang down loosely. A winding then also takes place, the industrial robot carrying out a tool change for this purpose. In one design variant, the plug housings are arranged on rotating plates, which are movable along a linear guide. After the plug housings are fitted, the rotating plates move into a predefined position, together with the plug housings arranged thereon.

SUMMARY OF THE INVENTION

On this basis, the object of the invention is to facilitate a system as well as a method for the automated manufacture of wiring harnesses of this type, which have a branched structure.

According to the invention, the object is achieved by a system for the automated manufacture of a wiring harness having the features of Claim 1. The object is furthermore achieved by a method for the automated manufacture of a wiring harness of this type having the features of Claim 15. The advantages and preferred embodiments mentioned with regard to the system are also similarly transferable to the method.

The system is used for the automated manufacture of a wiring harness, which has a branched structure made up of multiple individual conductor elements. The system comprises a control unit for controlling the individual process workflows of the system, a distribution station for distributing the conductor elements in a predefined distribution structure according to the branched structure of the wiring harness, as well as a second transport system. The second transport system comprises a second rail system, which includes multiple second rails oriented in parallel to each other, which are adjustable in a first direction independently of each other and depending on the predefined branched structure of the wiring harness. The second transport system furthermore includes multiple second transporters, which are each designed to receive a wire end of a particular conductor element. The second transporters are movable along the second rail in a second direction. During operation, the second transporters as well as the second rails are activated in such a way that the desired distribution structure is generated by moving the second rails in the first direction and by moving the second transporters along the second rails and thus in the second direction. Since the particular wire ends of the individual conductor elements are arranged on the second transporters, the wiring harness assembled from the individual conductor elements is thereby effectively spread apart by the automatic movement of the second rails as well as the second transporters. As a result, an individual laying of the individual conductor elements along a provided course is not necessary. The spreading apart of the wiring harness and the assumption of the branched structure of the wiring harness thus take place automatically with the aid of the special second transport system within the distribution station.

A two-dimensional plane, in which the individual transporters assume the desired distribution structure in their end positions, is spanned by the movement of the second transporters and the second rails.

In one preferred embodiment, this plane is a vertical plane, i.e. the first direction and the second direction span the vertical plane. The first direction is, in particular, a vertical direction, i.e. the second rails are movably arranged in the vertical direction. Correspondingly, the second direction is a longitudinal direction, which runs, in particular, in the horizontal direction. The wiring harness to be manufactured is therefore formed as a whole in a "suspended" manner.

Overall, the system is used to completely automatically manufacture a wiring harness. During the manufacturing process, the wiring harness spread apart in the distribution station passes through multiple additional second processing stations, which follow each other successively. A process or manufacturing step is carried out in each of these processing stations, so that the wiring harness is formed successfully in the manner of a production line. The system is preferably divided into two parts, the individual conductor elements needed by the particular wiring harness being prepared individually in a first part of the system, and specifically provided in a collection or buffer station. They are then removed therefrom and assembled for a wiring harness to be manufactured in each case and placed into the desired branched structure. The assembly of the individual conductor elements and the formation of the wiring harness take place in the second part of the system.

One particular advantage of the system may be seen in that the number and type of conductor elements as well as the configuration of the wiring harness as such may be predefined for each individual wiring harness by the automated manufacture of one particular individual wiring harness. The second transporters then assume the distribution structure in the distribution station according to the particular individual wiring harness. It is predefined in each case which of the second transporters are to be fitted for the particular individual wiring harness and how this is to be done via the control unit. An automatic manufacture of the wiring harness and a simultaneously high degree of individualization of the particular wiring harness are both facilitated by this measure. Due to the many process degrees of freedom during manufacturing, the system is therefore able on the whole to assemble consecutive wiring harnesses, which are manufactured one after the other in different configurations, and to manufacture them without requiring any manual intervention.

In one expedient embodiment, the system comprises a manipulator, which is designed, in particular, to individually receive the conductor elements, specifically from the aforementioned buffer station and to fit the second transporters with the received conductor elements. The manipulator is, in particular, a robot, specifically an industrial robot, and generally a multi-axis jointed-arm robot. The latter typically has adjusting capabilities in multiple degrees of freedom, in particular in multiple linear degrees of freedom as well as in multiple rotational degrees of freedom. The manipulator comprises a total of one robot hand, which is suitably designed to grip the individual conductor elements from the provision station (buffer station) and to fix them to the second transporters.

At least one portion of the second transporters may be expediently fitted with plug housings. The plug housings are provided for receiving the wire ends of the conductor elements. These plug housings are plug housings of the finished wiring harness. Insofar, a prefabrication stage is effectuated here. The wire ends, which are usually prepared with contact elements, are inserted or laid into the plug housings via the manipulator. Due to the fitting with the aid of the manipulator, a high process security is constituted. It is specifically provided that a process monitoring function, for example a position monitoring and/or a force monitoring of the insertion force, is formed during the fitting process.

In addition to the plug housings, the second transporters are also expediently provided or fitted with deflecting elements or other holders. The deflecting elements are used, for example, to bend the individual conductor elements at defined positions of the branched structure, for example at branches.

The additional holders are used, for example, to receive wire ends of two conductor elements, which are, in particular, fusion-bonded to each other. In wiring harnesses, it is necessary to a certain extent for conductor elements to be brought to the same reference potential and connected to each other for this purpose, for example by welding. The holders are used to receive wire ends connected in this manner. The second transporters may each be expediently fitted with the plug housings and/or the deflecting elements or the holders. This means that the latter may be temporarily fixed to the second transporters. To fit the individual second transporters with the plug housings, the deflecting elements or the holders, another manipulator is expediently disposed, which is suitably designed for this fitting process.

The second transporters are preferably generally guided in a circuit along the second rail system. The second transporters are first fitted with the plug housings, etc. needed for the particular wiring harness, after which the conductor elements are individually fastened to the transporters, and the wiring harness to be manufactured is then spread apart into the branched structure and automatically finished. In the end, the finished wiring harness is removed from the second transporters, and the latter are guided back again and refitted with plug housings, deflecting elements, etc. for the next wiring harness.

The fitting of the second transporters with the wire ends of the conductor elements takes place, in particular, in the area of a so-called plug station. The aforementioned manipulator is disposed at this plug station, and the second transporters are provided on two rails of this plug station. A precisely defined number of second transporters, including a predefined fitting with plug housings, deflecting elements or holders, is provided on the second rails for this plug station, depending on the wiring harness to be manufactured. Multiple second rails arranged in parallel to each other are formed at the plug station. The individual second transporters having the wiring harness-specific fitting are distributed to these multiple second rails. For each individual wiring harness to be manufactured, the second transporters are therefore individually provided for the wiring harness to be manufactured at the beginning of the production line formed by the second processing station.

With regard to a preferably high process speed, the system and the control unit are designed in such a way that the second transporters are provided in a pushed-together state for fitting with the conductor elements and moved out of this state into the distribution structure during operation, in particular, at the plug station. The second transporters are therefore combined preferably close together for fitting purposes. This means that the second transporters situated on the same rail are largely pushed together. In addition, the second rails are brought preferably close together. After fitting, the second transporters then assume the distribution structure.

Multiple processing steps are typically necessary for manufacturing a wiring harness. In particular, the conductor elements must be fixed to each other. In one preferred embodiment, the system therefore generally has multiple second processing stations, which are arranged directly abutting each other. Each of these second processing stations preferably includes multiple second rails, which are each movable individually in the first direction, i.e., in particular, in the vertical direction. The distribution structure may thus be assumed in each second processing station. Specifically for fixing the conductor elements to each other, it is advantageous if they are arranged in the distribution structure, so that the fixing may suitably take place, for example at branch points, so that, in particular, dimensionally stable branches are formed.

In one expedient embodiment, the control unit is furthermore designed in such a way that the second rails of adjacent second processing stations are brought into an aligned orientation with respect to each other, depending on the distribution structure. The second rails of adjacent processing stations merge directly with each other, so that the second transporters may be transferred from one second rail to the other.

In one preferred embodiment, the second transporters are moved from the one processing station to the subsequent processing station, maintaining the assumed distribution structure of the second transporters. The spread-apart wiring harness is moved between the processing stations in this spread-apart position.

In one expedient embodiment, the second transporters are generally movable individually and re drivable individually. This ensures that the desired distribution structure may be individually assumed in each case via the second transporters.

The second transporters are may be expediently electrically or magnetically driven. The drive takes place, for example, in the manner of a linear motor. In the case of a magnetic or electromagnetic drive, it is provided, in particular, that the second transporters are driven via changing magnetic fields in the manner of a suspension railway. The second transporters are generally guided along the second rails in the manner of a carriage. The individual second transporters effectively each comprise a separate drive unit. In the case of a magnetic drive, in the simplest case this drive unit is made up of a permanent magnet or an electromagnet. Magnets, in particular electromagnets, are then distributed along the second rails. Magnets, in particular permanent magnets, are also correspondingly arranged on the second transporters. A continuous magnetic field, which drives the transporters, is generated by means of corresponding polarity reversal of the electromagnets.

The system is—as mentioned above—also designed to fix the conductor elements. In particular, another manipulator is provided for fixing purposes. The control unit and the system are now designed in such a way that the conductor elements are fixed while being spread apart into the distribution structure. High cycle rates are achieved hereby. The corresponding manipulator is expediently arranged in a movable manner, so that it may follow the spreading movement.

Alternatively or additionally, the fixing or a further fixing of the conductor elements also takes place after the spreading apart into the distribution structure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

In the figures, parts having the same function are provided with the same reference numerals.

DETAILED DESCRIPTION

Figure 1:
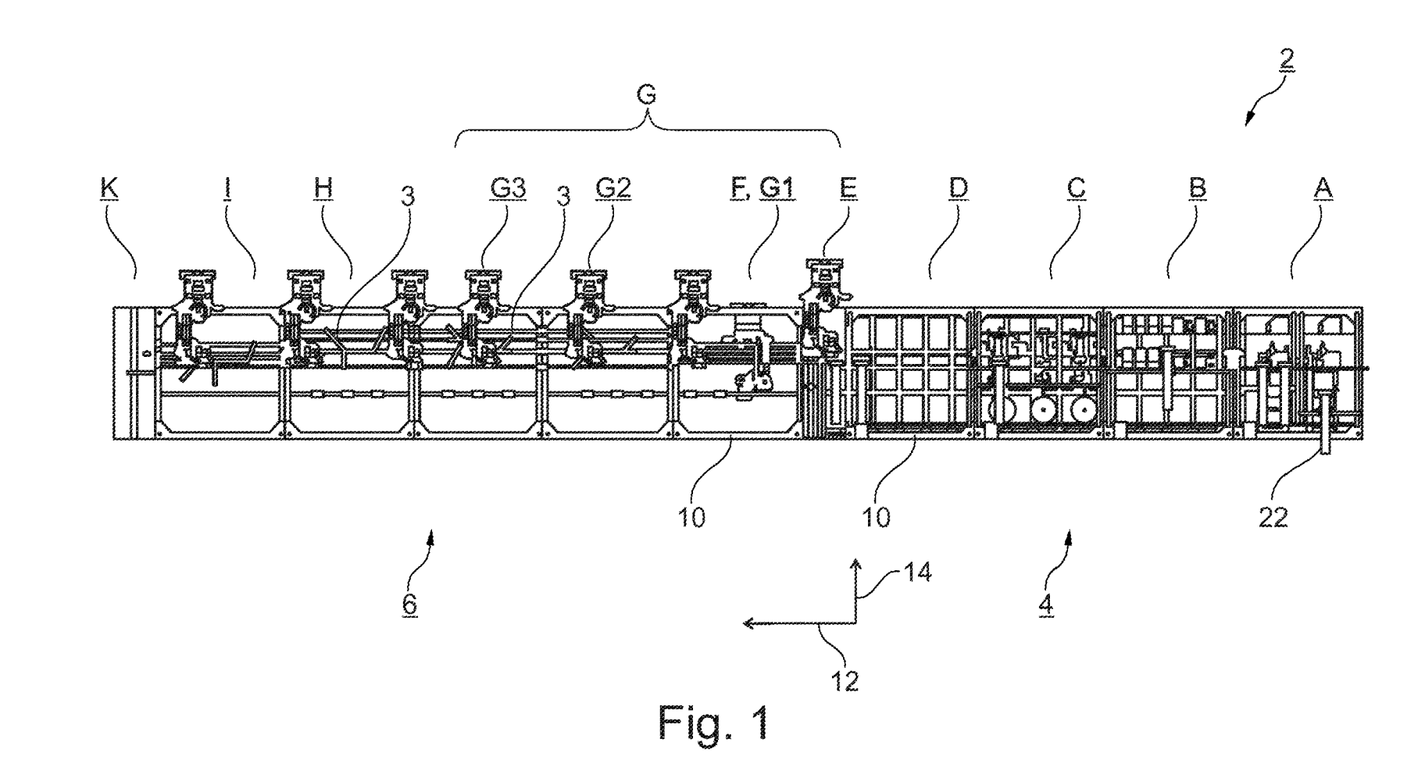
FIG. 1 shows a front view of a system for the automatic manufacture of a wiring harness, including a first part and a second part.
Figure 2:
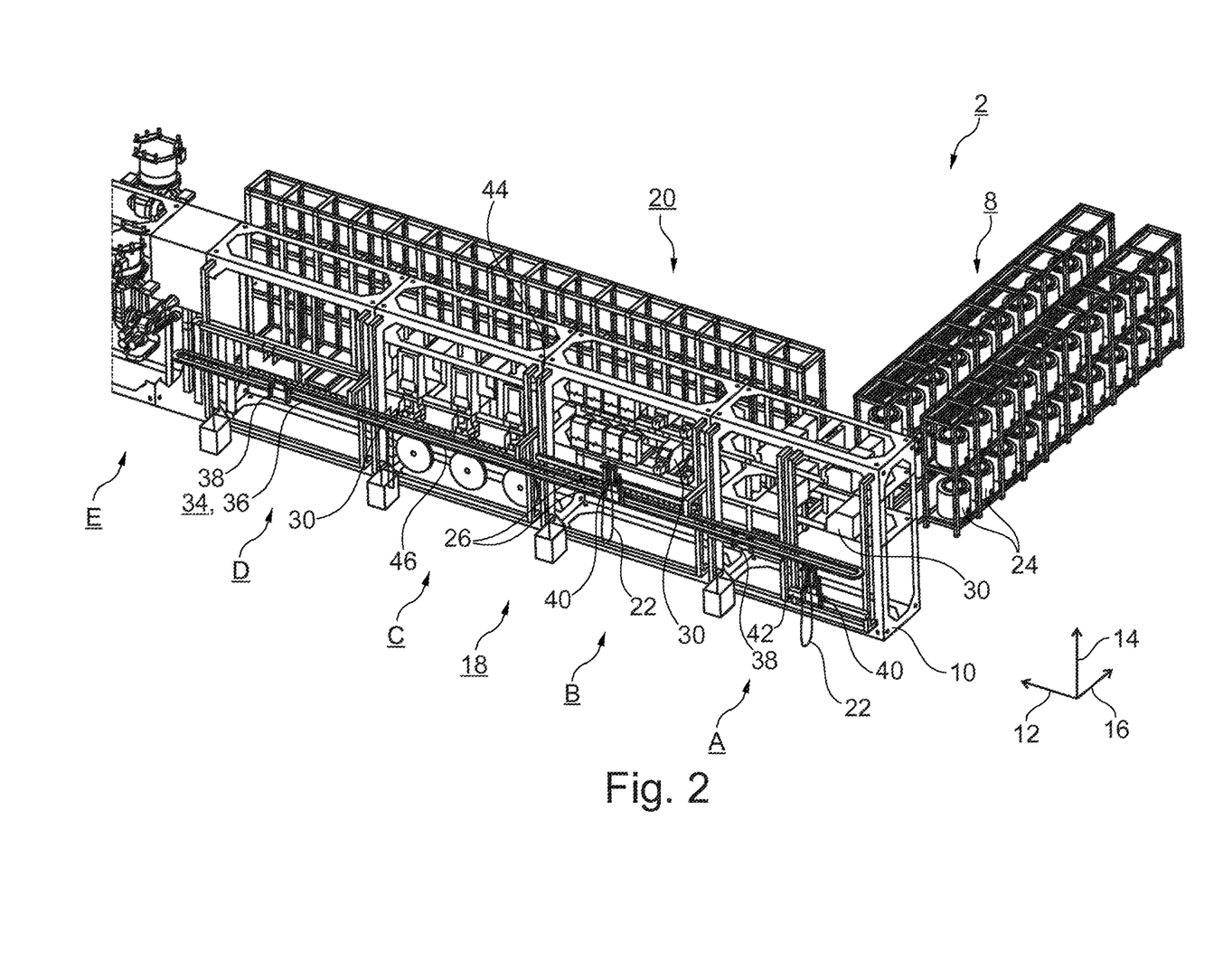
FIG. 2 shows a detail of a perspective representation of the system in the area of the first part, together with a storage unit.
Figure 3:
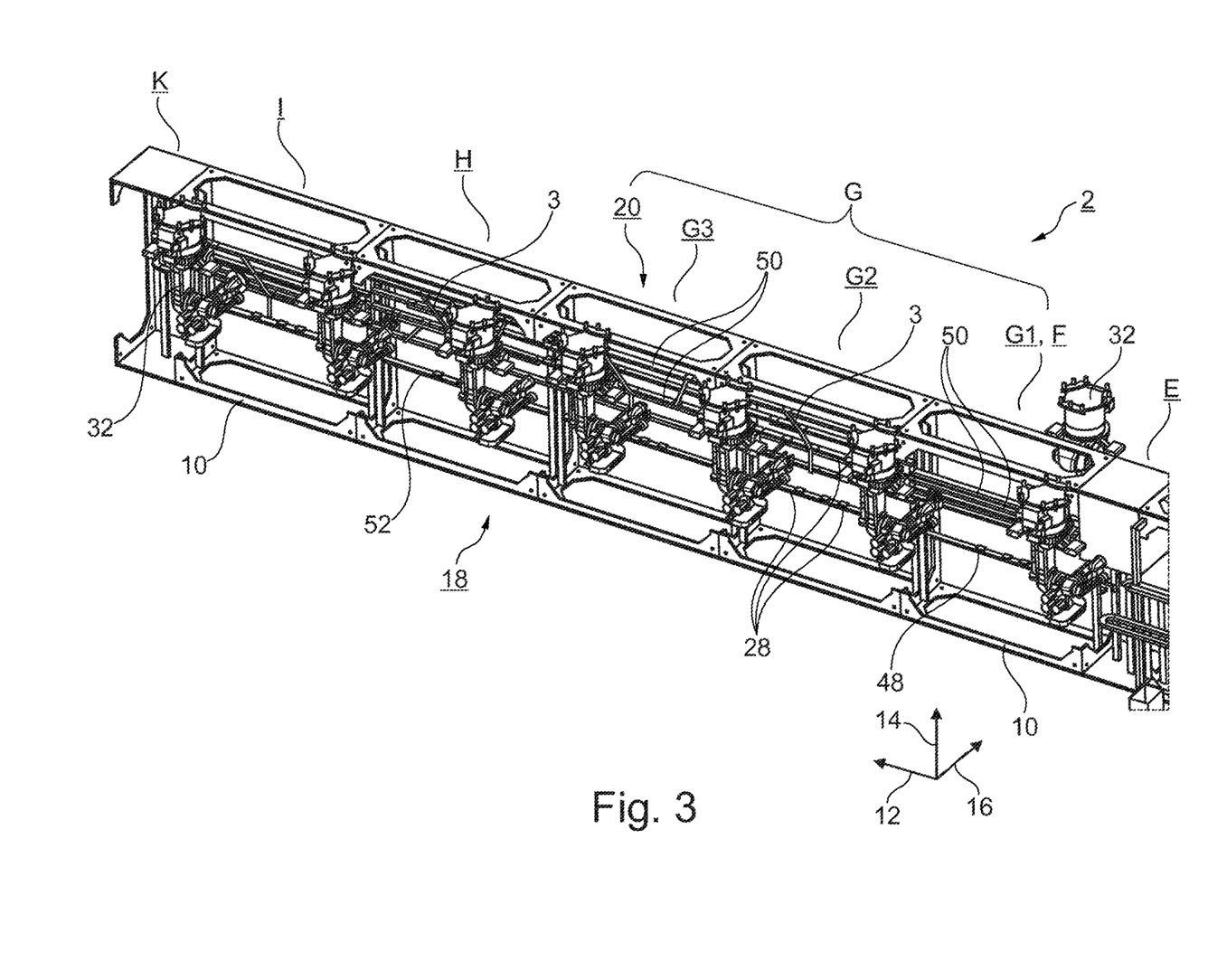
FIG. 3 shows a detail of a perspective representation of the system in the area of the second part.

System 2 illustrated in FIGS. 1 through 3 is used for the automated manufacture of a wiring harness 3 and is provided with a modular design made up of a variety of individual processing stations. The system has a first part 4 comprising first processing stations A, B, C, D as well as a second part comprising second processing stations E, F, G, H, I, K. A storage unit 8, which is designed in the manner of a vertical rack, is arranged upstream from first part 4. Individual processing stations A through K each have a frame 10, which essentially defines a framework, within which processing units for carrying out different work steps are arranged in first part 4. Frames 10 are fastened directly adjacent to each other and form a frame arrangement extending, in particular, linearly. Frames 10 are arranged side by side in a longitudinal direction 12. Frames 10 are set up in the manner of shelving. They extend upward in a vertical direction 14 and have a depth extending in a transverse direction 16. Longitudinal direction 12 and vertical direction 14 span a vertical plane, transverse direction 16 being oriented perpendicularly thereto. In the exemplary embodiment, storage unit 8 is arranged running in transverse direction 16. Due to the alignment of frames 10 in a vertical orientation, the entire frame arrangement has a front side 18 and a back side 20.

During the manufacture of wiring harness 3, system 2 is passed through successively in longitudinal direction 12 from first processing station A to last processing station L. In the exemplary embodiment of illustrated modular system 2, the following processing stations are provided:

A cutting station A, a stripping station B, a contacting station C, a buffer station D. Second part 6 begins with a plug station E, following by a distribution station F, a multi-part fixing station G, which in the exemplary embodiment includes three substations G1, G2, G3, further followed by a clip station J, a packaging station I and an end or collection station K.

Conductor elements 22 are first prepared in first part 4 of system 2. These conductor elements are, in particular, wires or twisted wires. They are provided as bulk goods via reels 24. Reels 24 are stored in storage unit 8.

Individual prepared conductor elements 22 are combined into wiring harness 3 in second part 6. This all takes place fully automatically without manual intervention. In the individual prefabrication stages, conductor elements 22 are each transported between individual processing stations A through D within first part 4 with the aid of a first transport system 26.

In second part 6, in which wiring harness 3 is assembled from individual conductor elements 22, the particular wiring harnesses are successively fed to individual processing stations E through J of second part 6 in their various prefabrication stages with the aid of a second transport system 28.

The individual processing steps in first part 4 are carried out with the aid of processing units 30, which are arranged within particular frame 10 of particular first processing station A through D.

In second part 6, the individual required work steps are carried out by manipulators 32, which in the exemplary embodiment are designed as multi-axis jointed-arm robots. A separate manipulator 32 is assigned to each individual processing station E through I. Individual manipulators 32 are movably arranged in longitudinal direction 12. In the exemplary embodiment, they are fastened in a suspended manner to an overhead rail, which is not illustrated in greater detail here.

As described in greater detail below, wiring harness 3 is spread apart according to a desired later branched structure in part 6 for the purpose of manufacturing wiring harness 3. Wiring harness 3 is therefore spread apart in a two-dimensional plane. This plane is oriented vertically, i.e. it is positioned in the vertical plane described above. Wiring harnesses 3 are arranged on a front side of frame 10. The processing therefore takes place on front side 18 of frames 10 with the aid of manipulators 32.

In system 2 illustrated in the exemplary embodiment, the following manufacturing steps are completed successively and automatically for the automatic production of wiring harness 3:

Multiple reels 24 are stored in storage unit 8, on which conductor elements 22 of different types are wound as continuous goods. The individual types of conductor elements 22 differ from each other, in particular, with regard to their cross sections, in particular cross sections of the conductors, color of the wire insulation or whether the wire is an individual wire or, in particular, a twisted wire pair.

In cutting station A, conductor elements 22 of different types, which are wound off reels 24, are cut to the necessary length for wiring harness 3 to be manufactured.

In stripping station B, wire ends of conductor elements 22 are stripped with the aid of corresponding stripping units in the form of processing units 30.

In contacting station C, contact elements, for example contact sockets or contact pins, are fastened on the ends to the exposed wire ends, i.e. to particular conductors of conductor element 22. This takes place, for example, by means of a crimping process.

Prepared conductor elements 22 are collected in buffer station D. A variety of conductor elements 22, which differ from each other in terms of their type and/or their length, are therefore situated in buffer station D in the manner of a temporary store.

First transport system 26 is used in each case to transport conductor elements 22 between individual processing stations A through D. It comprises a first rail system 34. The latter comprises a revolving guide rail 36. on which individual, separately movable first transporters 38 are arranged. These first transporters 38 are carrier units, movable along guide rail 36 in the manner of carriages. They are each designed to receive one or multiple conductor elements, in particular in a suspended manner. The transfer to these first transporters 38 from or at a particular processing station A through D takes place with the aid of positioning units 40, which are movable by transverse rails 42 along longitudinal direction 12. Transverse rails 42, in turn, are movable by vertical rails 44 along the vertical direction.

First rail system 34 is generally made up of a variety of first rails 46. A particular first rail 46 is assigned to a particular frame 10 and has, in particular, its length. First rail system 34 is therefore also provided with a modular design corresponding to the frame arrangement. First rails 46 of adjacent processing stations are in alignment with each other to form revolving guide rail.

Second transporters 48 of second transport system 28 are fitted with conductor elements 22 in plug station E. At least one portion of second transporters 48 is fitted with plug housings 60 for this purpose (cf. FIG. 4). The contact elements attached to the wire ends of conductor elements 22 are inserted thereinto. Some of second transporters 48 may also be provided or fitted with holders for receiving interconnected wire ends of two conductor elements 22. Finally, some of the second transporters are designed to guide or deflect conductor elements 22 or are fitted with corresponding deflecting elements or holders.

The fact that second transporters 48 are distributed to multiple second rails 50 of second transport system 28 is particularly important within plug station E. Second rails 50 are arranged in parallel to each other. The individual wire ends of conductor elements 22 are each suitably fixed on one second transporter 48, which are arranged distributed over second rails 50. All conductor elements 22 needed in plug station E for wiring harness 3 to be manufactured are taken from buffer station D and fastened to second transporters 48. This takes place with the aid of manipulator 32 assigned to plug station E.

Plug station E is a comparatively narrow station. At this station, second transporters 48 may each be preferably arranged close together. Second rails 50, which are arranged in parallel to each other, are preferably arranged directly side by side.

Second transporters 48 fitted with conductor elements 22 are transferred to additional second rails 50 in distribution station F. A distribution of second transporters 48, and thus the wire ends of conductor elements 22, into the branched structure predefined by wiring harness 3 takes place in distribution station F. Individual second transporters 48 therefore assume a distribution structure within the vertical plane according to the branched structure of wiring harness 3. For this purpose, second transporters 48 are moved on their particular second rail 50 into a predefined position in longitudinal direction 12. At the same time, second rails 50 arranged in parallel to each other are pulled apart in vertical direction 14, so that the desired branched structure results. In the illustration in FIG. 3, an intermediate situation is shown, in which the complete distributor structure is not yet assumed within distribution station F. The distribution structure is apparent at the subsequent processing stations.

The spreading apart of second rails 50 and the movement of second transporters 48 into their predefined longitudinal position in the longitudinal direction does not necessarily have to be concluded in distribution station F. This may take place, for example, at least partially in subsequent fixing station G.

The individual conductor elements are fixed to each other in fixing station G, specifically to fix the predefined branched structure, i.e. to provide a certain stability. For this purpose, multiple substations G1, G2, G3 are expediently provided, which are designed, for example, for different fixing methods.

As is apparent based on FIGS. 1, 3, distribution station F as well as first fixing station G1 are combined with each other and therefore share a frame 10.

(Fastening) clips are attached as needed in the clip station. These are typically fastened to wiring harness 3 with the aid of a taping.

Packaging station I is used to remove finished wiring harness 3 and for the further transport thereof. For this purpose, wiring harness 3 is removed from second rails 50 with the aid of assigned manipulator 32.

In collection station K, individual second transporters 48 are collected and fed to a shared return rail 52. The latter runs on back side 20 and extends up to plug station E. At this station, second transporters 48 are again suitably fitted with plug housings 60 with the aid of a manipulator 32 arranged on back side 20 and thus prepared for manufacturing next wiring harness 3.

Second transport system 28 comprises second rails 50 described above and second transporters 48. Similarly to first transporters 38, second transporters 48 are arranged in the manner of carriages movable along rails 50. Individual second transporters 48 are separately movable and comprise an electromagnetic drive system. Second rails 50 are each movable in vertical direction 40. Each processing station E through I has a number of second rails 50, which are arranged in parallel to each other. Second rails 50 each extend only over the length of one particular frame 10 of one particular processing station E through I. Second rails 50 are brought into an aligned arrangement for transferring second transporters 48 between adjacent processing stations.

Figure 4:
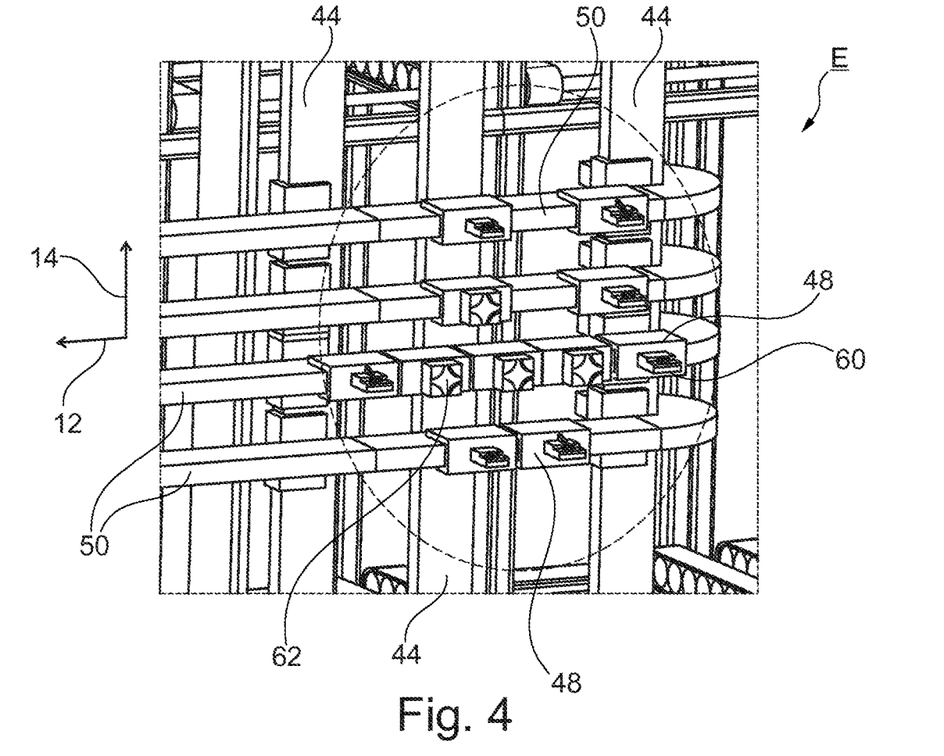
FIG. 4 shows a detail of a view in the area of a plug station, at which multiple second transporters are provided.

FIG. 4 shows an enlarged representation in the transition area between plug station E and distribution station F. Each of second rails 50 of plug station E as well as distribution station F is apparent here. Second rails 50 are in alignment with each other. In the illustrated exemplary embodiment, a total of four second rails 50 are arranged in each processing station E, F. They are individually movably arranged along vertical rails 44 in vertical direction 14.

Multiple second transporters 48, which are arranged distributed over the multiple second rails 50, are arranged on second rails 50.

Individual second transporters 48 are fitted with different elements, in particular with plug housings 60 and with deflecting elements 62. Individual second transporters 50 are as a whole arranged in a preferably dense arrangement with respect to each other. Second rails 50 are preferably moved in a pushed-together state. At the same time, individual second transporters 48 are arranged on particular second rails 50 close together or with no space between them at all. In this position illustrated in FIG. 4, second transporters 48, in particular plug housings 60 attached thereto as well as deflecting elements 62, are fitted with conductor elements 22. Manipulator 32 is used for this purpose, which is assigned to plug station E. The prepared wire ends of conductor elements 22 are inserted into plug housings 60. The wire ends are typically preconfigured with contact elements, for example crimp elements.

Figure 5:
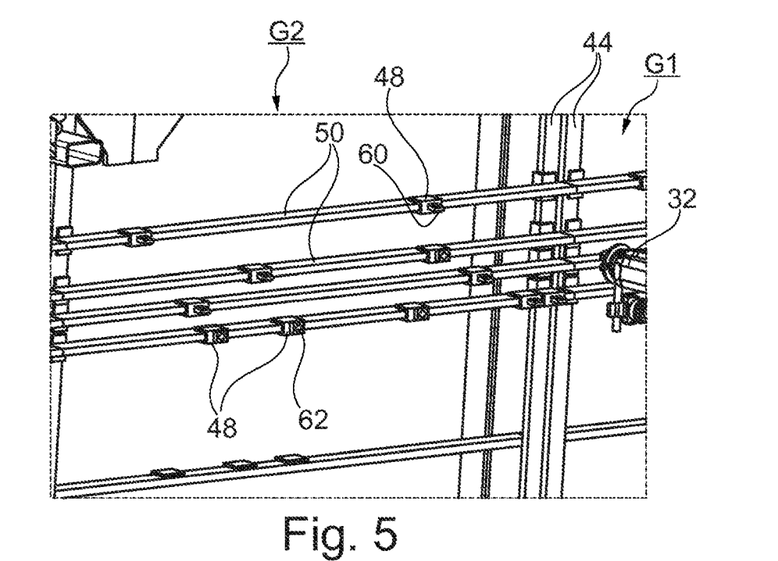
FIG. 5 shows an enlarged detail of a representation in the transition area between the plug station and a distribution station, in which the second transporters are transferred to a distribution structure.

Second transporters 48 are subsequently transferred from plug station E to second rails 50 of subsequent distribution station F. The "spreading apart" into the desired distribution structure of the wiring harness then takes place in distribution station F. Individual second transporters 48 are pulled apart along their particular second rail 50 in longitudinal direction 12. At the same time, second rails 50 are also pulled apart in vertical direction 14. In the end, second transporters 48 assume a distribution structure illustrated, for example, in FIG. 5. FIG. 5 shows a view, for example, of one of fixing stations G1, G2, G3 or of combined distribution station F/fixing station G1. Conductor elements 22 are not illustrated in either FIG. 4 or FIG. 5.

Figure 6:
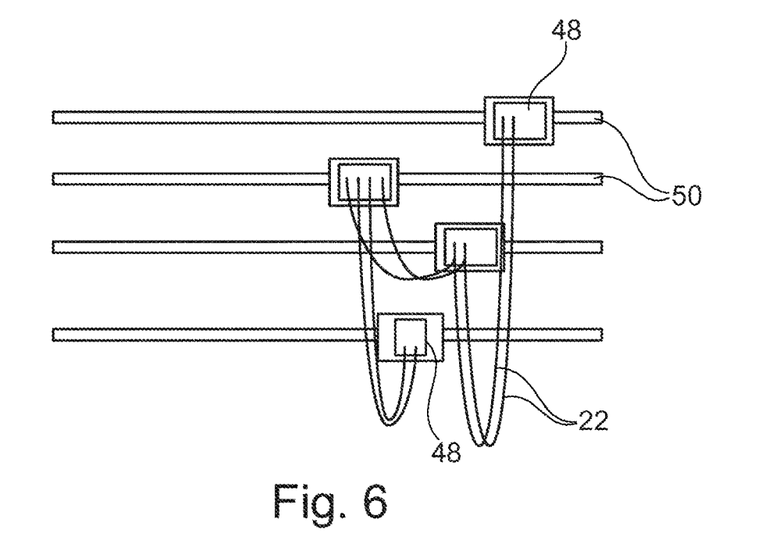
FIG. 6 shows a greatly simplified representation of second transporters, including conductor elements attached thereto.

Examples of conductor elements 22 are illustrate only in FIG. 6. It is clearly apparent that individual conductor elements 22 are each fastened to second transporters 48 by their wire ends. Due to the vertical arrangement of the entire system and frames 10, individual conductor elements 22 are suspended on second transporters 48. Since they are each held by their wire ends, each of the conductor elements is arranged suspended approximately in a U shape. FIG. 6 shows a situation in the area of plug station E, in which individual second transporters 48 are thus arranged close together and not yet in the targeted distribution structure.

Figure 7:
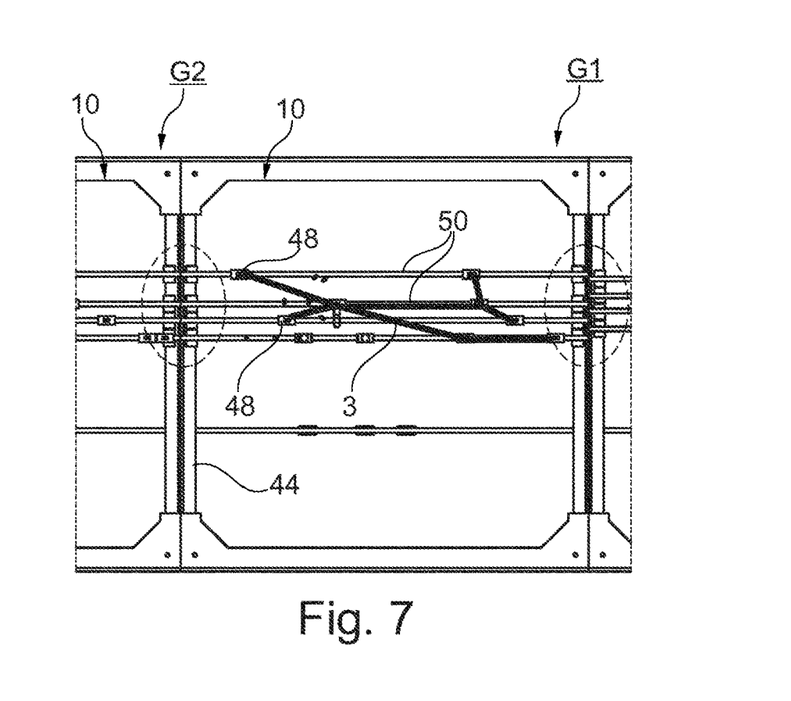
FIG. 7 shows a front view of another second processing station, in which the second transporters are arranged in the distributed structure and hold a wiring harness.

FIG. 7 shows a view of one of the second processing stations, for example of fixing stations G1, G2, G3, with wiring harness 3 in the branched structure. The aligned orientation of second rails 50 of the processing station, in which wiring harness 3 is presently held, and the subsequent processing station (left half of the image) are clearly apparent. After wiring harness 3 has been processed in the processing station, it is transferred in the spread-apart structure, i.e. in the distribution structure of second transporters 48, to the subsequent second processing station, for example another fixing station G2, maintaining the branched structure.

The fact that the individual second transporters 48 are separately drivable and thus may each assume an individual position on the particular second rail, is of particular importance to system 2 described here. At the same time, each of second rails 50 is individually movable to each second processing station, so that the distances between two adjacent rails 50 in vertical direction 14 are freely adjustable.

This makes it possible to predefine an individual distribution structure for each wiring harness to be manufactured and to also assume this structure accordingly. On the whole, the automated manufacture of individual wiring harnesses having different branched structures is made possible thereby. The desired distribution structure, as well as the selection of the required conductor elements, plug housings, etc., is predefined via the control unit, which is not illustrated in greater detail here.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A system for automatic manufacturing of a wiring harness having a branched structure made up of multiple individual conductor elements, the system comprising:

a group of first processing stations that individually prepare the conductor elements of the wiring harness and a group of second processing stations that distribute the conductor elements of the wiring harness;

a control unit that controls process workflows of the system; and a first manipulator and a second manipulator, wherein the first manipulator comprises a gripper, provided to fit the wire-ends of the conductor elements to a second transporter; the second manipulator comprises a gripper, provided to fit the second transporters with a plug housing, wherein one station of the group of second processing stations is a distribution station for distributing the conductor elements into a predefined distribution structure that corresponds to the branched structure of the wiring harness, wherein the group of second processing stations has a second transport system, comprising:

a second rail system which includes multiple second rails oriented in parallel to each other, the second rails being adjustable in a first direction independently of each other and depending on the branched structure of the wiring harness; and multiple second transporters which are each designed to receive one wire-end of a selected conductor element, and which are movable along the second rails in a second direction, so that the predefined distribution structure is generated by moving the second rails in the first direction and by moving the second transporters along the second rails in the second direction, wherein each of multiple adjacent second processing stations include the second rails that are each individually movable in the first direction, and wherein the control unit is designed such that the second rails of adjacent second processing stations are brought into an aligned orientation with respect to each other, depending on the predefined distribution structure and so that the second transporters are transferable between the adjacent second processing stations along the aligned second rails.

2. The system according to claim 1, wherein the first direction and the second direction span a vertical plane, within which the second transporters are movable.

3. The system according to claim 2, wherein at least one portion of the second transporters is fitted with plug housings which receive the wire-ends of the conductor elements.

4. The system according to claim 3, wherein the group of second processing stations further includes a plug station, wherein the first manipulator is provided at the plug station to fit the wire-ends of the conductor elements to the plug housings of the second transporters, and wherein the second transporters are provided on the second rails of the plug station.

5. The system according to claim 4, wherein the control unit is designed in such a way that a defined number of the second transporters having the plug housings is provided on the second rails at the plug station, depending on the wiring harness to be manufactured.

6. The system according to claim 1, wherein the control unit is designed in such a way that the second transporters are provided in a pushed-together state for fitting with the wire-ends of the conductor elements during operation, and are moved from the pushed-together state into the predefined distribution structure in the distribution station.

7. The system according to claim 6, wherein the control unit is configured in such a way that the second transporters, once in the predefined distribution structure, are moved from the distribution station to an adjacent second processing station during operation while maintaining the predefined distribution structure.

8. The system according to claim 1, wherein the second transporters are individually movable.

9. The system according to claim 8, wherein the second transporters are electrically or magnetically drivable.

10. The system according to claim 6, wherein a manipulator is provided for fixing the conductor elements to each other, and the control unit is configured in such a way that the fixing of the conductor elements takes place during spreading apart of the conductor elements into the predefined distribution structure.

11. A method for automatic manufacturing of a wiring harness, which has a branched structure that is made up of multiple individual conductor elements, the conductor elements being prepared by a group of first processing stations and combined together into the wiring harness by a group of second processing stations and the conductor elements being automatically distributed into a predefined distribution structure that corresponds to the branched structure of the wiring harness in a distribution station which is one station of the group of second processing stations; a first and a second manipulators, wherein the first manipulator comprising a gripper is provided to fit a wire-end of the conductor element to a second transporter; the second manipulator comprising a gripper is provided to fit the second transporter with a plug housing; the group of second processing stations having a second transport system that includes a second rail system with multiple second rails oriented in parallel to each other and adjustable in a first direction as well as multiple second transporters distributed onto the second rails and being movable along the second rails in a second direction, the second transporters each being fitted with one wire-end of the conductor elements, and the second rails subsequently moved in the first direction, and the second transporters being moved along the second rails in the second direction to form the predefined distribution structure, wherein each of the second processing stations include the second rails that are each individually movable in the first direction; and the second rails of adjacent second processing stations being brought into an aligned orientation with respect to each other, depending on the predefined distribution structure so that the second transporters are transferable between the adjacent second processing stations along the aligned second rails.

12. The system according to claim 1, wherein the second rails of the adjacent second processing stations are initially out of alignment with each other before being brought into the aligned orientation.

13. The method according to claim 11, wherein the second rails of the adjacent second processing stations are initially out of alignment with each other before being brought into the aligned orientation.

14. A system for automatic manufacturing of a wiring harness having a branched structure made up of multiple individual conductor elements, the system comprising:

a control unit that controls process workflows of the system;

a first manipulator comprises a gripper, provided to fit wire-ends of the conductor elements to a second transporter; a second manipulator comprises a gripper, provided to fit the second transporter with a plug housing; and a distribution station for distributing the conductor elements that are prepared by a group of first processing stations into a predefined distribution structure that corresponds to the branched structure of the wiring harness, wherein the distribution station has a second transport system, comprising:
a second rail system which includes multiple second rails oriented in parallel to each other, the second rails being adjustable in a first direction independently of each other and depending on the branched structure of the wiring harness; and
multiple second transporters which are each designed to receive one wire-end of a selected conductor element, and which are movable along the second rails in a second direction, so that the predefined distribution structure is generated by moving the second rails in the first direction and by moving the second transporters along the second rails in the second direction,
wherein the second rails that are each individually movable in the first direction, and
wherein the second transporters are individually movable and each comprise a separate drive unit.

* * * * *